US012762796B2

(12) United States Patent
Walls et al.

(10) Patent No.: US 12,762,796 B2
(45) Date of Patent: Oct. 13, 2026

(54) SYSTEMS AND METHODS FOR GENERATING MAPS USING SLICED DATA AND TRANSFORMERS

(71) Applicant: Woven by Toyota, Inc., Tokyo (JP)

(72) Inventors: Jeffrey M. Walls, Mountain View, CA (US); Ryan M. Wiesenberg, South Lyon, MI (US)

(73) Assignee: Woven By Toyota, Inc., Tokyo (JP)

( * ) Notice: Subject to any disclaimer, the term of this patent is extended or adjusted under 35 U.S.C. 154(b) by 128 days.

(21) Appl. No.: 18/467,012

(22) Filed: Sep. 14, 2023

(65) Prior Publication Data

US 2025/0095293 A1 Mar. 20, 2025

(51) Int. Cl.
*G06T 17/05* (2011.01)
*G06V 10/762* (2022.01)
*G06V 10/77* (2022.01)
*G06V 20/56* (2022.01)

(52) U.S. Cl.
CPC ............ *G06T 17/05* (2013.01); *G06V 10/762* (2022.01); *G06V 10/7715* (2022.01); *G06V 20/588* (2022.01)

(58) Field of Classification Search
None
See application file for complete search history.

(56) References Cited

U.S. PATENT DOCUMENTS 10,867,190 B1 * 12/2020 Vajna .................... G06V 10/776
2020/0398856 A1 * 12/2020 Giurgiu ............... B60W 40/072
2023/0176216 A1 * 6/2023 Desai ..................... G01C 21/12
356/5.01

(Continued)

FOREIGN PATENT DOCUMENTS

CN 114494158 A 5/2022
CN 115546750 A 12/2022

(Continued)

OTHER PUBLICATIONS

Lin et al., "Semi-Supervised Lane Detection With Deep Hough Transform", 2021 IEEE International Conference on Image Processing (ICIP), pp. 1514-1518 (Year: 2021).*

(Continued)

*Primary Examiner* — Terrell M Robinson
*Assistant Examiner* — Jonathan M Cofino
(74) *Attorney, Agent, or Firm* — Christopher G. Darrow; Darrow Mustafa, PC

(57) ABSTRACT

Systems, methods, and other embodiments described herein relate to generating maps using transformer encoding that infers lane information from sliced data. In one embodiment, a method includes generating a sequence of lateral slices for a road graph using discrete three-dimensional (3D) representations, and the sequence forms a road edge connected in the road graph that topologically describes a mapped area. The method also includes identifying parameters by channelizing the sequence individually for estimating lane boundaries along the road edge. The method also includes encoding features across the sequence by a transformer correlating context and the parameters about the lateral slices. The method also includes decoding the features across the sequence using a learning model for computing a lane structure along the road graph.

20 Claims, 5 Drawing Sheets

(56) References Cited

U.S. PATENT DOCUMENTS

2023/0237813 A1* 7/2023 Corte .................. G06V 10/225
382/103

FOREIGN PATENT DOCUMENTS

| | | | |
|---|---|---|---|
| CN | 115713741 | A | 2/2023 |
| KR | 20160132866 | A | 11/2016 |
| KR | 20220096351 | A | 7/2022 |

OTHER PUBLICATIONS

Vaswani et al., "Attention Is All You Need", Dec. 4-9, 2017, Advances in Neural Information Processing Systems, vol. 30, pp. 1-11 (Year: 2017).*

Shin et al. "InstaGraM: Instance-level Graph Modeling for Vectorized HD Map Learning," arXiv:2301.04470, Jan. 10, 2023, pp. 1-11.

Sultana et al. "Vision-Based Lane Detection and Tracking under Different Challenging Environmental Conditions," arXiv:2210.10233, 2022, pp. 1-16.

Bai et al. "Weakly Supervised Object Localization via Transformer with Implicit Spatial Calibration," Computer Vision, ECCV, Jul. 21, 2022, pp. 612-628.

Lin et al. "Semi-supervised lane detection with Deep Hough Transform," 2021 IEEE International Conference on Image Processing (ICIP), Anchorage, AK, USA, pp. 1514-1518.

Xu et al. "RNGDet++: Road Network Graph Detection by Transformer with Instance Segmentation and Multi-scale Features Enhancement," IEEE Robotics and Automation Letters, vol. 8, No. 5, pp. 2991-2998.

Donovan et al. "A Simple Approach to Constructing Quasi-Sudoku-based Sliced Space-Filling Designs," Annals of the Institute of Statistical Mathematics, vol. 69, Feb. 19, 2015, pp. 865-878.

* cited by examiner

SYSTEMS AND METHODS FOR GENERATING MAPS USING SLICED DATA AND TRANSFORMERS

TECHNICAL FIELD

The subject matter described herein relates, in general, to generating maps by slicing data, and, more particularly, to generating maps using transformer encoding that infers lane information from sliced data.

BACKGROUND

Vehicles share information over networks for systems to perform various tasks. The information may include road features, global positioning system (GPS) history, weather conditions, traffic intelligence, and so on. Vehicles equipped with sensors can acquire the information to perceive other vehicles, obstacles, pedestrians, and additional aspects of a surrounding environment. For example, a vehicle may be equipped with a light detection and ranging (LIDAR) sensor that uses light to scan the surrounding environment, while logic associated with the LIDAR analyzes acquired information for detecting object presence within the surrounding environment. In further examples, cameras acquire information about the surrounding environment for deriving awareness about aspects of the surrounding environment. This sensor information is useful in various circumstances for improving perceptions of the surrounding environment so that systems such as automated driving systems (ADS) can accurately plan and navigate accordingly.

In various implementations, a system can assemble a database of fleet data by acquiring the aforementioned sensor information for generating a map. However, the system generating detailed maps from this information encounters difficulties from lacking accuracy, particularly when relying on GPS history that can be coarse. Furthermore, system accuracy suffers when the fleet data is sparse within a particular geographic region. Accordingly, vehicles executing automated driving and other complex tasks may have reduced reliability from inaccurate maps generated by systems.

SUMMARY

In one embodiment, example systems and methods relate to generating maps using transformer encoding that infers lane information from sliced data. In various implementations, systems generating maps using real-world data encounter difficulties from missing data and coarse information. For example, vehicles in a geographic area acquire camera data about road objects and global positioning system (GPS) information that lack detail for generating quality maps. As such, automated driving systems (ADS) may plan a route using the map with reduced reliability, thereby decreasing safety. Therefore, in one embodiment, an estimation system generates a map using a transformer and a learning model that processes three-dimensional (3D) representations of a road graph through manageable lateral slices. Here, the estimation system assembles a sequence of the lateral slices for estimating lane structure (e.g., line color, line shape, line direction, etc.) along a road edge by identifying parameters (e.g., line color, dashed lines, etc.) of the sequence individually. The features are decoded across the sequence using a learning model to improve efficiency and accuracy. A lateral slice may be a subsection of the road edge having fixed dimensions and discretized data (e.g., line type) about the road edge for efficient computations.

In one approach, an encoder computes features across the sequence with the transformer correlating context (e.g., lane appearances) about the lateral slices for the road edge. For example, the transformer (e.g., a neural network) infers a lane characteristic that fills information gaps using a structural relationship about the road edge across the lateral slices. Accordingly, the estimation system efficiently processes the 3D representations through the lateral slices being manageable segments while increasing accuracy by the transformer encoding individually and across the lateral slices.

In one embodiment, an estimation system for generating maps using transformer encoding that infers lane information from sliced data is disclosed. The memory stores instructions, that when executed by a processor, cause the processor to generate a sequence of lateral slices for a road graph using discrete 3D representations, and the sequence forms a road edge connected in the road graph that topologically describes a mapped area. The instructions also include instructions to identify parameters by channelizing the sequence individually to estimate lane boundaries along the road edge. The instructions also include instructions to encode features across the sequence by a transformer correlating context and the parameters about the lateral slices. The instructions also include instructions to decode the features across the sequence using a learning model to compute a lane structure along the road graph.

In one embodiment, a non-transitory computer-readable medium for generating maps using transformer encoding that infers lane information from sliced data and including instructions that when executed by a processor cause the processor to perform one or more functions is disclosed. The instructions include instructions to generate a sequence of lateral slices for a road graph using discrete 3D representations, and the sequence forms a road edge connected in the road graph that topologically describes a mapped area. The instructions also include instructions to identify parameters by channelizing the sequence individually to estimate lane boundaries along the road edge. The instructions include instructions to encode features across the sequence by a transformer correlating context and the parameters about the lateral slices. The instructions include instructions to decode the features across the sequence using a learning model to compute a lane structure along the road graph.

In one embodiment, a method for generating maps using transformer encoding that infers lane information from sliced data is disclosed. In one embodiment, the method includes generating a sequence of lateral slices for a road graph using discrete 3D representations, and the sequence forms a road edge connected in the road graph that topologically describes a mapped area. The method also includes identifying parameters by channelizing the sequence individually for estimating lane boundaries along the road edge. The method also includes encoding features across the sequence by a transformer correlating context and the parameters about the lateral slices. The method also includes decoding the features across the sequence using a learning model for computing a lane structure along the road graph.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with generating maps using transformer encoding that infers lane information from sliced data are disclosed herein. In various implementations, systems forming maps using data from vehicles (e.g., fleet data) have difficulties from processing incomplete information about a geographic area. As such, the maps can lack details and fidelity demanded by complex tasks such as path planning with an automated driving system (ADS), thereby decreasing safety. Furthermore, systems computing maps from fleet data encounter sizable and unstructured information, thereby drawing increased computing power. Therefore, in one embodiment, an estimation system discretizes three-dimensional (3D) representations of vehicle data (e.g., position, lane lines, object images, etc.) that are sparse into manageable lateral slices for generating maps by a transformer and a learning model. A lateral slice may be a subsection of a road edge having fixed dimensions and discretized data (e.g., line type) that increases computational efficiency. Here, the estimation system may assemble a sequence of lateral slices by segmenting the road edge from a road graph that topologically represents a road network. In particular, the road edge may be a road segment that connects with other road edges at an intersection. In one approach, the estimation system identifies salient parameters (e.g., line color, dashed lines, etc.) about the road graph by channelizing the sequence individually along or across the road edge for transformer encoding (e.g., neural network encoding). In this way, the transformer efficiently processes the road edge through segmentation with the lateral slices and channelization for identifying the salient parameters.

In various implementations, the transformer encodes features across the sequence by correlating context and the salient parameters. Here, the context can describe visual details about the lane boundaries. In one approach, the transformer forms clusters from the sequence for estimating a lane characteristic about a target slice having an information gap. For example, the transformer fills the information gap according to a structural relationship about the road edge between the target slice and the cluster. Regarding decoding, the estimation system decodes the features across the sequence using a learning model for computing a lane structure (e.g., line color, line shape, line direction, etc.) along the road graph. The estimation system can assemble a map by organizing the target slice within the lateral slices according to the context. Accordingly, the estimation system can also learn the lane structure efficiently and accurately by relying on a sequence rather than lateral slices individually having sparse input, thereby improving system robustness.

Figure 1:
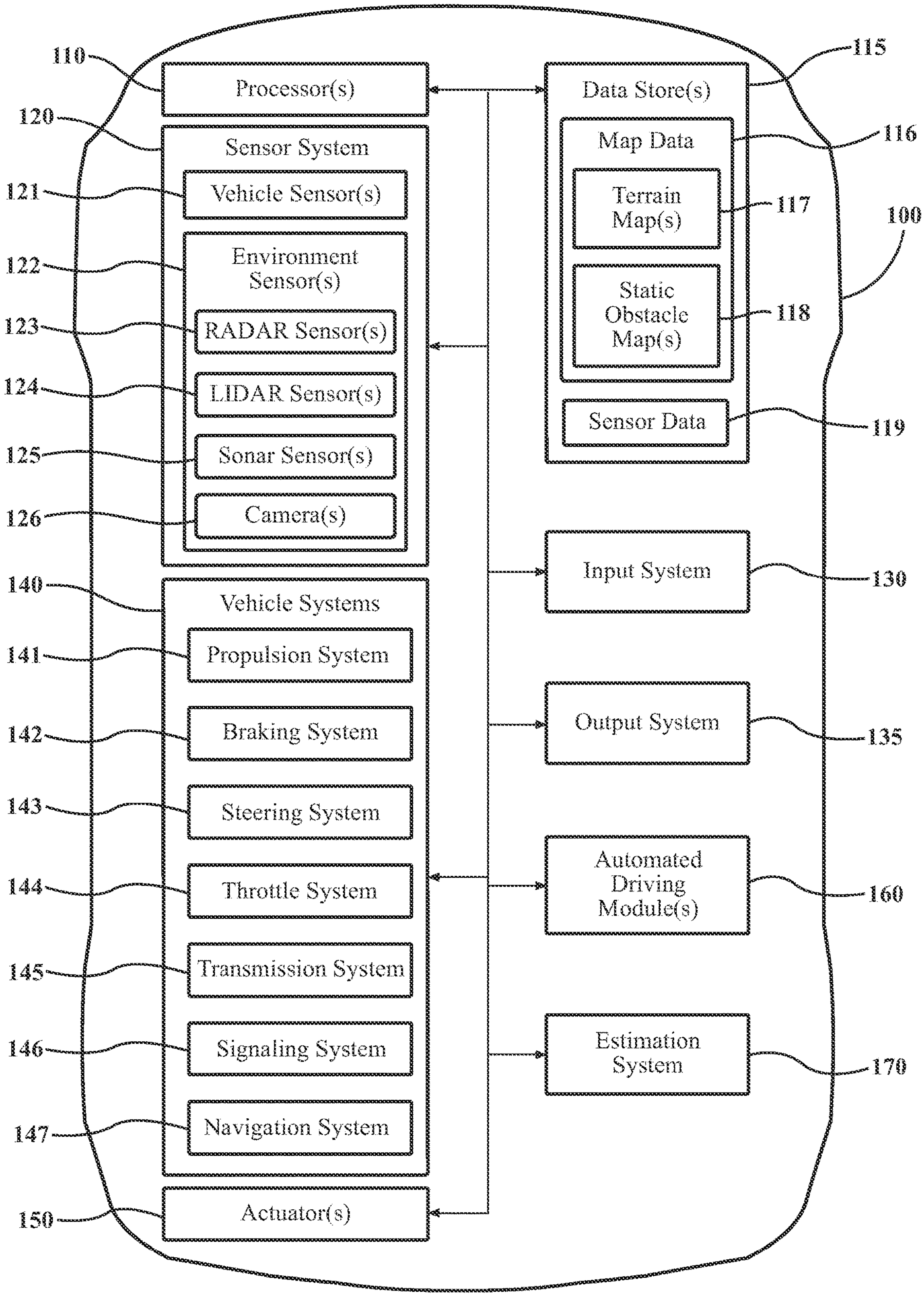
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, an estimation system 170 uses road-side units (RSU), consumer electronics (CE), mobile devices, robots, drones, and so on that benefit from the functionality discussed herein associated with generating maps using transformer encoding that infers lane information from sliced data.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an estimation system 170 that is implemented to perform methods and other functions as disclosed herein relating to improving map generation using transformer encoding that infers lane information from sliced data.

Figure 2:
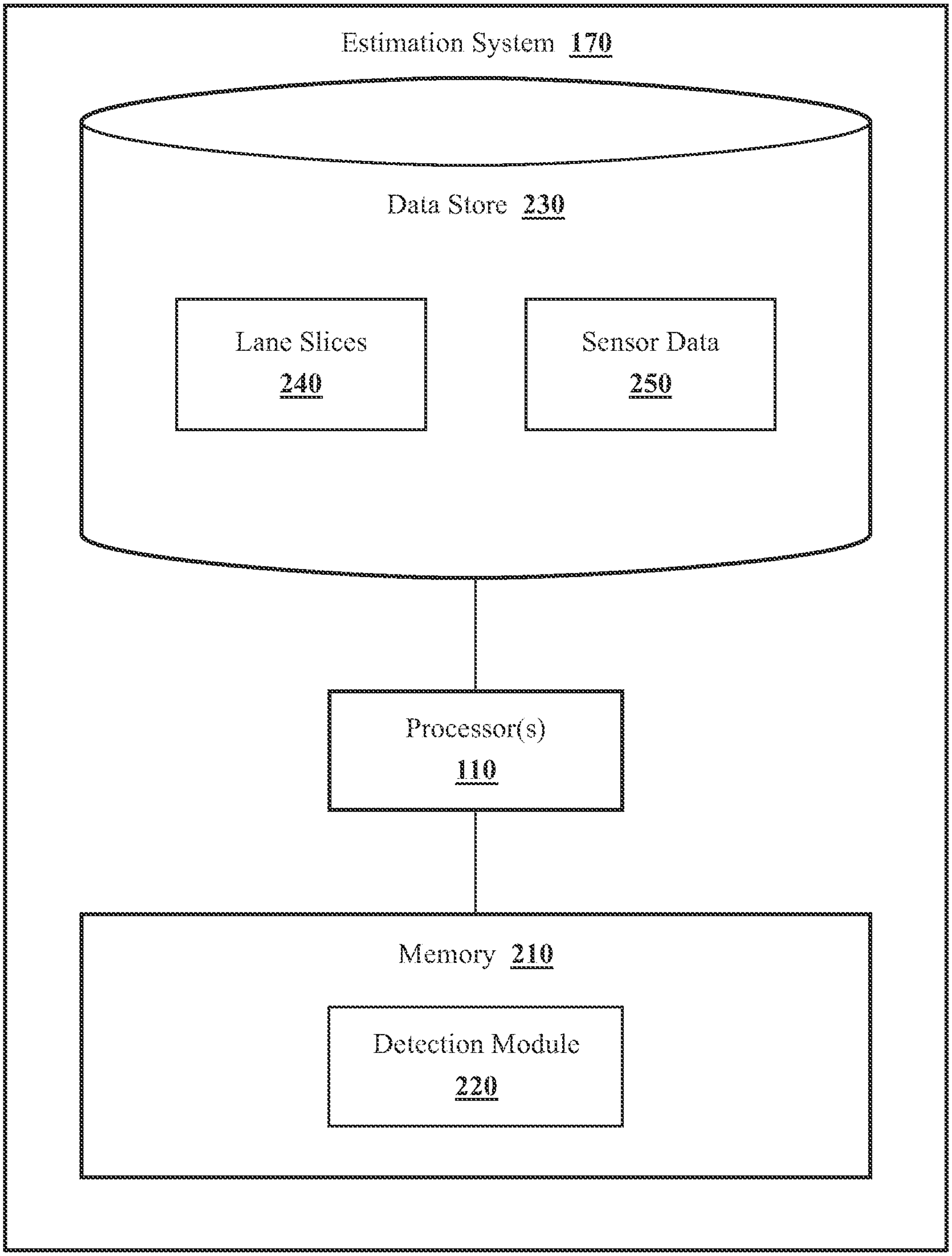
FIG. 2 illustrates one embodiment of an estimation system that is associated with generating maps using transformer encoding and a learning model.

With reference to FIG. 2, one embodiment of the estimation system 170 of FIG. 1 is further illustrated. Although the embodiment implements the estimation system 170 in vehicle 100 for online computations, the estimation system 170 can also be executed offline on a server that generates maps. Online estimations benefit the vehicle 100 operating in an automated mode that demands high-resolution and accurate map data. Offline estimations benefit from additional computing power than the vehicle 100, thereby improving accuracy and computation speed.

Moreover, the estimation system 170 is shown as including a processor(s) 110 from the vehicle 100 of FIG. 1. Accordingly, the processor(s) 110 may be a part of the estimation system 170, the estimation system 170 may include a separate processor from the processor(s) 110 of the vehicle 100, or the estimation system 170 may access the processor(s) 110 through a data bus or another communication path. In one embodiment, the estimation system 170 includes a memory 210 that stores a detection module 220. The memory 210 is a random-access memory (RAM), a read-only memory (ROM), a hard-disk drive, a flash memory, or other suitable memory for storing the detection module 220. The detection module 220 is, for example, computer-readable instructions that when executed by the processor(s) 110 cause the processor(s) 110 to perform the various functions disclosed herein.

The estimation system 170 as illustrated in FIG. 2 is generally an abstracted form of the estimation system 170 as may be implemented between the vehicle 100 and a cloud-computing environment. Furthermore, the detection module 220 generally includes instructions that function to control the processor(s) 110 to receive data inputs from one or more sensors of the vehicle 100. The inputs are, in one embodiment, observations of one or more objects in an environment proximate to the vehicle 100 and/or other aspects about the surroundings. As provided for herein, the detection module 220, in one embodiment, acquires the sensor data 250 that includes at least camera images. In further arrangements, the detection module 220 acquires the sensor data 250 from further sensors such as radar sensors 123, LIDAR sensors 124, and other sensors as may be suitable for identifying vehicles and locations of the vehicles. In one approach, the sensor data 250 is fleet data acquired by a server from purchased vehicles, test vehicles, and so on of a manufacturer.

Accordingly, the detection module 220, in one embodiment, controls the respective sensors to provide the data inputs in the form of the sensor data 250. Additionally, while the detection module 220 is discussed as controlling the various sensors to provide the sensor data 250, in one or more embodiments, the detection module 220 can employ other techniques to acquire the sensor data 250 that are either active or passive. For example, the detection module 220 may passively sniff the sensor data 250 from a stream of electronic information provided by the various sensors to further components within the vehicle 100. Moreover, the detection module 220 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In one embodiment, the estimation system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the detection module 220 in executing various functions. In one embodiment, the data store 230 includes the sensor data 250 along with, for example, metadata that characterize various aspects of the sensor data 250. For example, the metadata includes location coordinates (e.g., longitude and latitude), relative map coordinates or tile identifiers, time/date stamps from when the separate sensor data 250 was generated, and so on.

Furthermore, the data store 230 includes the lane slices 240 representing subsections of the road edge and may include detection points from the 3D representations. Here, the 3D representations can have discrete and sparse detection points about lane boundaries, lane lines, lane colors, lane types, and so on acquired or generated by the estimation system 170. Furthermore, the estimation system 170 can identify parameters (e.g., line color, dashed lines, etc.) about the road edge for featurization by individually counting detection points. Such counting can be for a channel or bin per lateral slice. In one approach, a bin includes discretized points of lateral position within a slice. However, a channel may be one of various ways to group points across a slice.

Regarding further details on channelization, a channel can be an input layer that detects one of ego vehicle location, ego left boundary, ego right boundary, ego next lane left boundary, ego next lane right boundary, road boundary left, road boundary right, boundary type (e.g., dashed, solid, color, etc.), and so on. A layer can apply learned weights in a learning model where the weight quantity is channels inputted multiplied by channels outputted. In this way, the estimation system 170 locates detection points present across separate channels for the transformer to infer relationships and lane structure with increased accuracy and detail.

Figure 3:
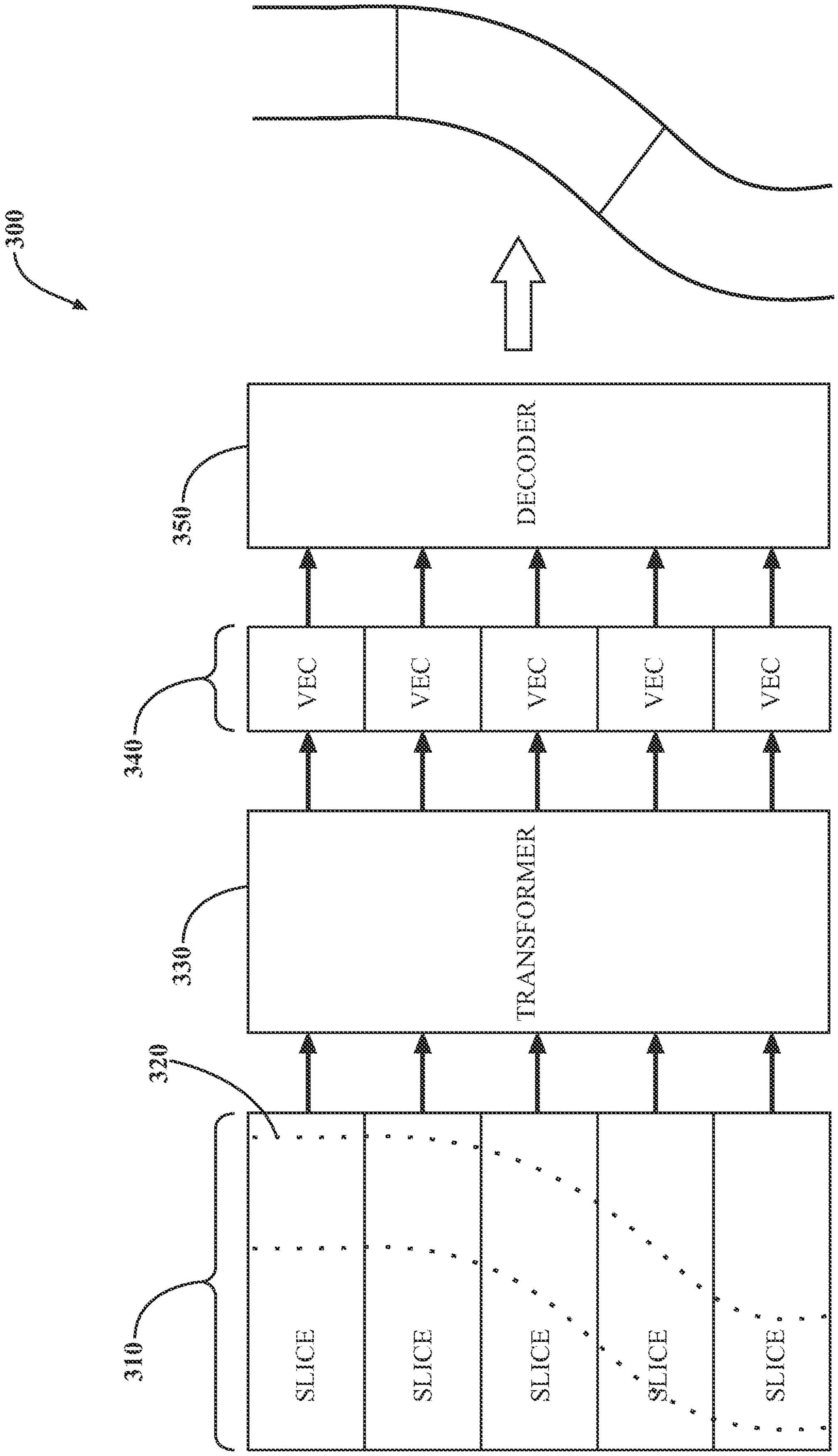
FIG. 3 illustrates one embodiment of the estimation system using a transformer to process sliced data and a decoder inferring lane structure.

Now turning to FIG. 3, one embodiment of the estimation system 170 using a transformer to process sliced data and a decoder inferring lane structure through the pipeline 300 is illustrated. Here, the detection module 220, in one embodiment, is configured to perform additional tasks beyond controlling the respective sensors to acquire and provide the sensor data 250. For example, the detection module 220 includes instructions that cause the processor 110 to discretize crude or coarse data into lateral slices 310 for segmentation along a road edge. In one approach, the road edge is a defined length on a road graph and the slices are of a fixed distance longitudinally along the road graph. In this way, the estimation system 170 can reduce computational costs without sacrificing accuracy or detail when assembling a map and allow single-shot estimates about the lane structure.

In FIG. 3, the detection points 320 can be 3D representations that span across the lateral slices 310. For example, the detection points 320 are associated with a lane boundary for a road edge. As previously explained, a road graph topologically represents a road network using road edges and nodes. The road edge can be a road segment that connects with other road edges at a node, such as an intersection. In one approach, the road segment is associated with a street block, mile marker divided areas, and so on that together with other road segments form a mapped area represented by the road graph. As such, the estimation system 170 can channelize and pre-process a sequence of lateral slices for the road graph using discrete 3D representations. The pre-processing before encoding by the transformer 330 can include the estimation system 170 identifying parameters (e.g., line color, dashed lines, etc.) from the channels for estimating lane boundaries along the road edge. In one approach, the parameters are tokens that are structured for discrete and simpler computations by the transformer 330. In this way, the estimation system 170 featurizes detection points separately per lateral slice but learns the lane structure across a sequence of lateral slices, thereby allowing predictions about the road edge with a single iteration.

Moreover, the transformer 330 encodes features across the sequence by correlating context and the parameters about the lateral slices intuitively. For example, the transformer 330 is a neural network using a feed-forward architecture that encodes the sequence as N-inputs and predicts relationships across the sequence. Here, the feed-forward architecture simplifies processing by having nodes connected circularly and inputs processed in one direction. The transformer 330 outputs N-vectors 340 with feature representations about the lane structure having abstract meanings for efficient decoding. For instance, the transformer 330 indicates that the feature representations are related with a three-lane road and the decoder 350 locates lane boundaries using the relationship, thereby intuitively predicting the lane structure.

Moreover, the encoding can involve developing correlations between data within the sequence so that the feature representations embed salient information across the lateral sequences instead of lateral slices discretely, thereby reducing computing costs. Here, the transformer 330 can learn relevant information for predictions at a position on the road edge through context sharing. As explained below, the estimation system 170 can select lateral slices from the sequence having increased relevance for a target slice. The context can describe visual and appearance details about lane boundaries, lane lines, and so on and include relationships between the details. In this way, the estimation system 170 assembles by learning across the sequence of lateral slices for the target slice per road edge with reduced processing.

In various implementations, the transformer 330 selects a cluster of lateral slices from the sequence near the target slice having an information gap using the context. For example, the information gap is a center line of a partially mapped area (e.g., a turn lane) that is missing and the cluster includes lateral slices having the center line. Here, the estimation system 170 and the transformer 330 can predict a lane characteristic that fills the information gap using a structural relationship about the road edge between the target slice and the cluster. After decoding the N-vectors 340, the estimation system 170 can assemble a map by efficiently organizing the target slice within the lateral slices according to the context, thereby reducing computing costs.

Regarding decoding, the estimation system 170 includes the decoder 350 that computes the features from the transformer 330 across the sequence using a learning model (e.g., a neural network, a convolutional neural network (CNN), etc.) and infers a lane structure along the road graph. Here, the decoder 350 can process the N-vectors 340 in parallel or serially for estimating lane structure according to available computing resources. For example, the decoder 350 outputs a characteristic that is one of a boundary shape, a boundary position, a line type (e.g., splitting, dashed, etc.), a surface type, a line color, a speed limit, a lane direction, and so on for the target slice from the sequence. The characteristic may be structured as a token that simplifies computations by the estimation system 170 for downstream tasks. Furthermore, the estimation system 170 can estimate a lane group by organizing the lateral slices according to the characteristic and infer missing data for the lane structure according to the lane group, thereby improving efficiency.

Still referring to FIG. 3, in one approach, the estimation system 170 locates a start, a continuation, and an end segment of the lane group according to the missing data for identifying the lateral boundaries about the road edge. For instance, the decoder 350 processes from the N-vectors 340 lateral slices that are adjacent for associating lane structure within and between the lateral slices. The lane structure can include the estimation system 170 deriving meanings such as a speed limit for a lateral slice or a roadway starting/ending for the road edge. In this way, the estimation system 170 efficiently classifies a learned vector to non-trivially classified data.

Figure 4:
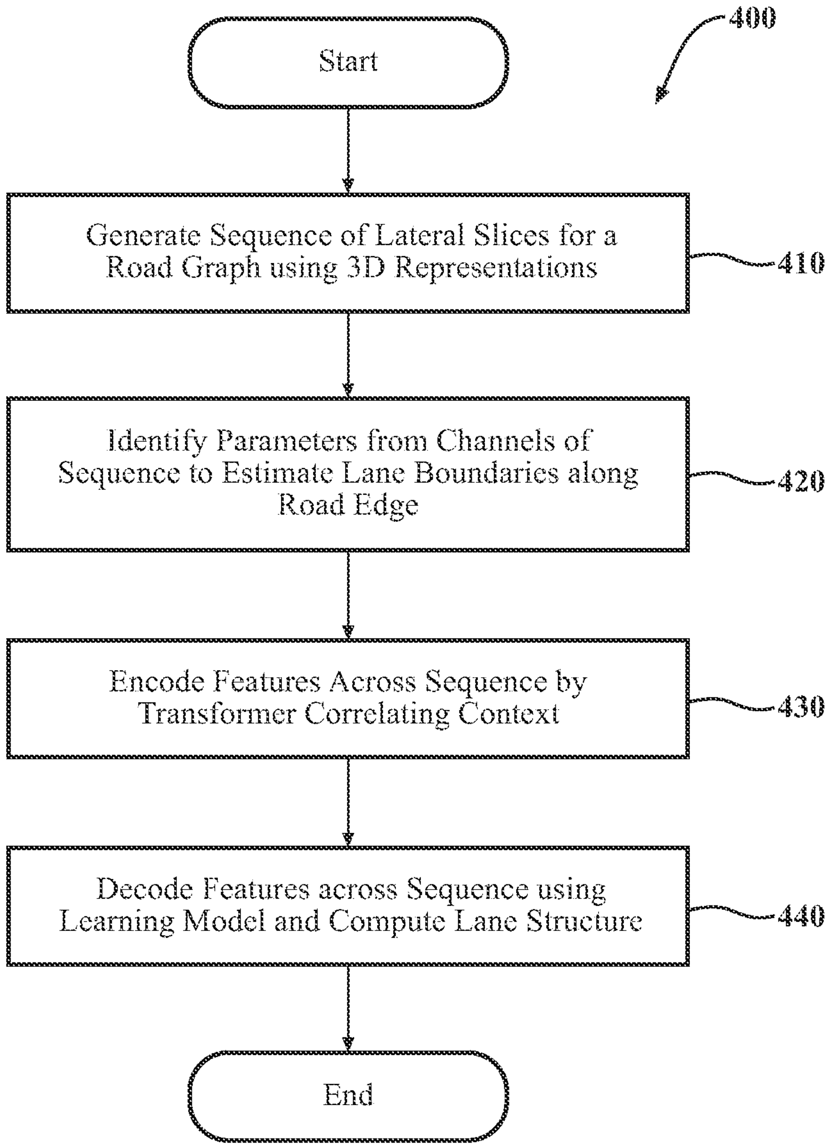
FIG. 4 illustrates one embodiment of a method that is associated with generating maps using transformer encoding that predicts lane information from sliced data.

Turning now to FIG. 4, one embodiment of a method 400 that is associated with generating maps using transformer encoding that infers lane information from sliced data is illustrated. The method 400 will be discussed from the perspective of the estimation system 170 of FIGS. 1 and 2. While the method 400 is discussed in combination with the estimation system 170, it should be appreciated that the method 400 is not limited to being implemented within the estimation system 170 but is instead one example of a system that may implement the method 400. Furthermore, the estimation system 170 may operate online in the vehicle 100 or offline on a server. As previously explained, online estimations benefit the vehicle 100 operating in an automated mode that demands high-definition and accurate map data. On the contrary, offline estimations benefit from increased computing power than the vehicle 100, thereby improving accuracy and computation speed.

At 410, the detection module 220 generates a sequence of lateral slices for a road graph using 3D representations. Here, the road graph includes road edges having a defined length and the lateral slices may be a fixed distance longitudinally along the road edge. A lateral slice may be a subsection of a road edge having fixed dimensions and discretized data (e.g., line type) about the road edge that is crude or coarse and allows efficient computations. Furthermore, the 3D representations can have discrete and sparse detection points about lane boundaries, lane lines, lane colors, lane types, and so on generated by the estimation system 170. Regarding the sequence of lateral slices, the estimation system 170 may segment the road edge into an N-sequence of lateral slices depending on computing power available and downstream applications. For example, the estimation system 170 segments the road edge into 50 (L)×300 (W) unit slices to estimate lane boundaries for lane tracking involving human assistance, thereby conversing computing power. However, the estimation system 170 generates finer slices of 10 (L)×100 (W) unit slices for automated driving that demands precision while sacrificing computing power. In either case, as previously explained, the estimation system 170 featurizes detection points separately per lateral slice but learns the lane structure across a sequence of lateral slices, thereby allowing predictions about the road edge efficiently and through a single iteration.

At 420, the estimation system 170 identifies parameters from channels of the sequence to estimate lane boundaries along the road edge. Here, the estimation system 170 can identify parameters (e.g., line color, dashed lines, etc.) about the road edge for featurization by individually counting detection points for a channel or bin per lateral slice. In one approach, a bin includes discretized points of lateral position within a slice. However, a channel may be one of various ways to group points across a slice. Furthermore, as previously explained, the parameters can be tokens that are structured for discrete and simpler computations by a transformer. In this way, the estimation system 170 locates detection points present across separate channels for the transformer to infer relationships and lane structure across the sequence with increased accuracy while reducing computation costs.

At 430, the estimation system 170 encodes features across the sequence by a transformer correlating context. Here, a transformer can encode features across the sequence by correlating context and the parameters about the lateral slices using data relationships and systematic intuition. In one approach, the transformer is a neural network using a feed-forward architecture for encoding the sequence as N-inputs. The transformer may output feature representations about a lane structure having abstract meanings for efficient decoding. For example, the transformer indicates that the feature representations are related with a three-lane road and the decoder locates lane boundaries using the relationship. In this way, the transformer infers relationships for detection points within the lateral slice for an encoder to extract features while considering inferences across the sequence.

Regarding details on encoding, the estimation system 170 develops correlations between data within the sequence through encoding. In particular, the transformer encoding involves extracting feature representations having salient information embedded across the lateral sequences instead of lateral slices discretely. For example, as previously explained, the transformer learns relevant information for predictions at a position on the road edge through context sharing about lane paint, dashed lines on adjacent lateral slices, and so on. The estimation system 170 fills missing information in a lateral slice with the predictions, accordingly. Furthermore, the context here describes visual and appearance details about lane boundaries, lane lines, and so on including relationships. In this way, the estimation system 170 assembles by learning across the sequence of lateral slices for the target slice per road edge through that context, thereby reducing computation costs.

Moreover, the transformer can cluster lateral slices to infer information gaps. For example, the transformer selects the cluster from the sequence near a target slice having an information gap using the aforementioned context. The information gap may be a center line of a partially mapped area (e.g., a turn lane) that is missing and the cluster includes lateral slices having the center line. As such, the estimation system 170 and the transformer can estimate a lane characteristic to fill the information gap using a structural relationship about the road edge between the target slice and the cluster. As previously explained, the estimation system 170 can assemble a map after decoding by organizing the target slice within the lateral slices according to the context and reduce computing costs accordingly.

Now turning to decodings, at 440 the estimation system 170 decodes the features across the sequence using a learning model and computes a lane structure for generating a map. Here, the learning model can be a neural network (e.g., a CNN) that infers the lane structure along the road graph. For example, the estimation system 170 outputs a characteristic that is one of a boundary shape, a boundary position, a line type (e.g., splitting, dashed, etc.), for the target slice from the sequence. The estimation system 170 processes the outputs to estimate a lane group by organizing the lateral slices with the characteristic and infer missing data for the lane structure of the lane group. In one approach, the estimation system 170 classifies segments (e.g., start, continuation, end, etc.) of the lane group according to the missing data for identifying the lateral boundaries of the road edge. Furthermore, the lane structure can include the estimation system 170 deriving meanings such as a speed limit for a lateral slice or a roadway starting/ending for the road edge. In this way, the estimation system 170 efficiently classifies outputs to non-trivially classified data. Accordingly, the estimation system 170 can also learn the lane structure efficiently and accurately using a sequence rather than lateral slices individually using sparse and coarse data, thereby improving system efficiency and robustness.

Figure 5:
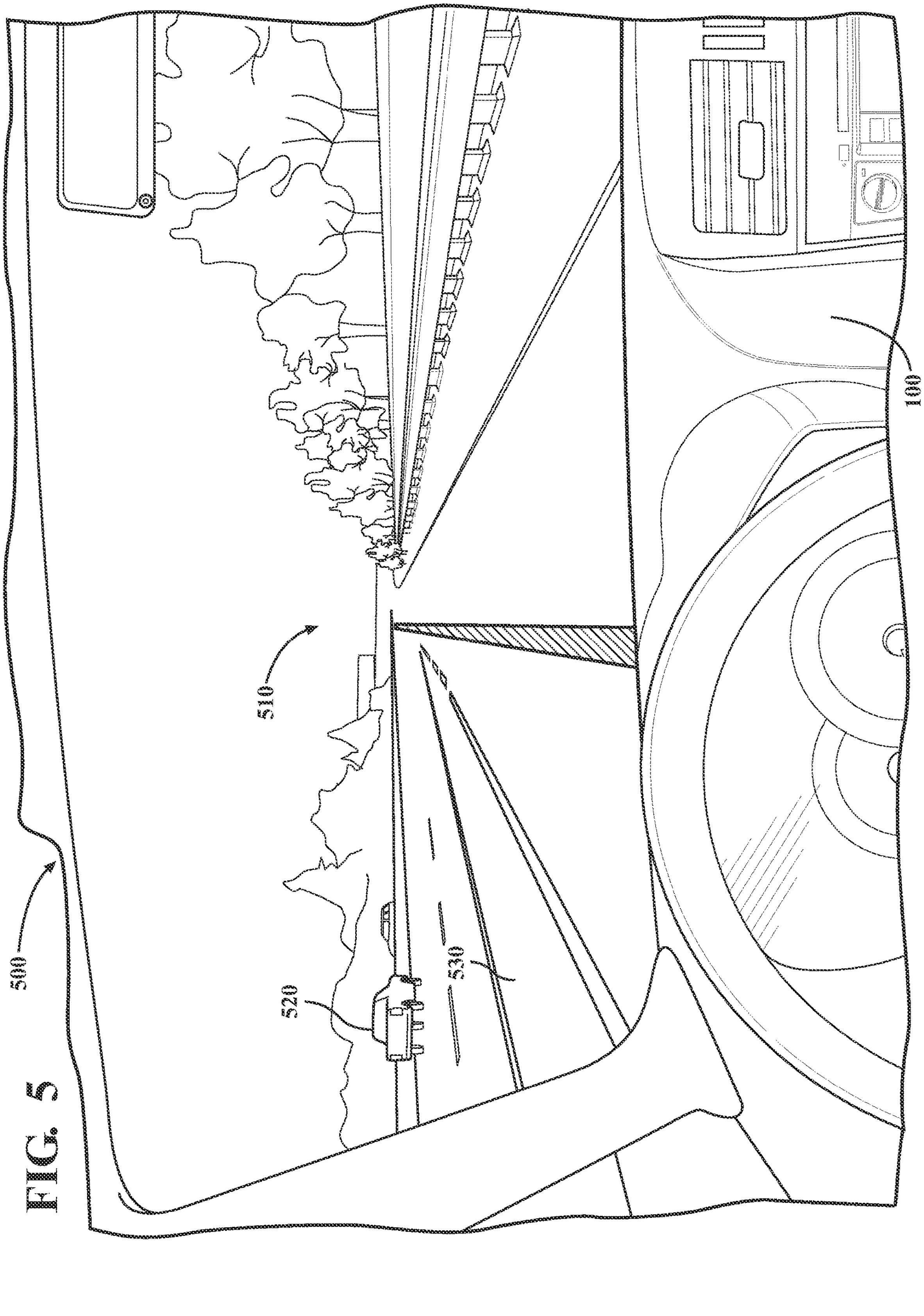
FIG. 5 illustrates an example of a vehicle implementing the estimation system and generating maps using a transformer.

Now turning to FIG. 5, an example of the vehicle 100 implementing the estimation system 170 and generating maps using a transformer in scenario 500 is illustrated. In one approach, the vehicle 100 acquires data about the driving scene 510 having the other vehicle 520 using the detection module 220. In one approach, the vehicle 100 generates maps for path planning by the automated driving module 160 on the lane 530. Here, the estimation system 170 identifies parameters from channels of a sequence to estimate lane boundaries along a road edge that includes the lane 530. Regarding encoding, the estimation system 170 encodes features across the sequence by a transformer correlating context. As previously explained, the context can describe appearance details and relationships about lane boundaries, lane lines, and so on. Furthermore, the estimation system 170 decodes the features across the sequence using a learning model and computes a lane structure that is accurate and reliable. Accordingly, the automated driving module 160 of the vehicle 100 can plan a path on the lane 530 more reliably using the lane structure, thereby improving safety and system performance.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, programmable read-only memory (PROM), erasable programmable read-only memory (EPROM), electrically erasable programmable read-only memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the estimation system 170, and/or the automated driving module(s) 160 can be operatively connected to communicate with the various vehicle systems 140 and/or individual components thereof. For example, the processor(s) 110 and/or the automated driving module(s) 160 can be in communication to send and/or receive information from the various vehicle systems 140 to control the movement of the vehicle 100. The processor(s) 110, the estimation system 170, and/or the automated driving module (s) 160 may control some or all of the vehicle systems 140 and, thus, may be partially or fully autonomous as defined by the society of automotive engineers (SAE) levels 0 to 5.

The processor(s) 110, the estimation system 170, and/or the automated driving module(s) 160 can be operatively connected to communicate with the various vehicle systems 140 and/or individual components thereof. For example, the processor(s) 110, the estimation system 170, and/or the automated driving module(s) 160 can be in communication to send and/or receive information from the various vehicle systems 140 to control the movement of the vehicle 100. The processor(s) 110, the estimation system 170, and/or the automated driving module(s) 160 may control some or all of the vehicle systems 140.

The processor(s) 110, the estimation system 170, and/or the automated driving module(s) 160 may be operable to control the navigation and maneuvering of the vehicle 100 by controlling one or more of the vehicle systems 140 and/or components thereof. For instance, when operating in an autonomous mode, the processor(s) 110, the estimation system 170, and/or the automated driving module(s) 160 can control the direction and/or speed of the vehicle 100. The processor(s) 110, the estimation system 170, and/or the automated driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be an element or a combination of elements operable to alter one or more of the vehicle systems 140 or components thereof responsive to receiving signals or other inputs from the processor(s) 110 and/or the automated driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor (s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic, or other machine learning algorithms. Furthermore, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the estimation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Furthermore, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk™, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all combinations of one or more of the associated listed items. As an example, the phrase "at least one of A, B, and C" includes A, B, C, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An estimation system comprising:

a memory storing instructions that, when executed by a processor, cause the processor to:

generate a sequence of lateral slices for a road graph using discrete three-dimensional (3D) representations, and the sequence forms a road edge that is a road segment connected in the road graph with another road edge at a node and the road graph topologically describes a mapped area;

identify parameters by channelizing the sequence individually to estimate lane boundaries along the road edge;

encode features across the sequence by a transformer that correlates context and the parameters about the lateral slices, and the transformer is a network having a feed-forward architecture, and select by the transformer a cluster of the lateral slices from the sequence near a target slice having an information gap using the context and the context has visual lateral details about the road edge and the lane boundaries; and decode the features across the sequence using a learning model to compute a lane structure along the road graph.

2. The estimation system of claim 1 further including instructions to:

estimate by the transformer a lane characteristic to fill the information gap using a structural relationship about the road edge between the target slice and the cluster; and assemble a map by organizing the target slice within the lateral slices according to the context.

3. The estimation system of claim 2, wherein the information gap is a center line of the mapped area that is missing and the cluster includes the lateral slices having the center line.

4. The estimation system of claim 1, wherein the instructions to identify the parameters further include instructions to count detection points in a bin for the lateral slices individually associated with the lane structure.

5. The estimation system of claim 1, wherein the instructions to decode the features further include instructions to:

output a characteristic that is one of a boundary shape, a boundary position, a line type, a line color, a speed limit, and a lane direction for the target slice from the sequence.

6. The estimation system of claim 5 further including instructions to:

estimate a lane group by organizing the lateral slices according to the characteristic;

infer missing data for the lane structure according to the lane group; and locate a start, a continuation, and an end segment of the lane group according to the missing data.

7. The estimation system of claim 1, wherein the lane structure includes locations of the lane boundaries, center lines, and colors associated with the road edge.

8. The estimation system of claim 1, wherein the lateral slices are subsections of the road edge having detection points from the discrete 3D representations that are sparse.

9. The estimation system of claim 1, wherein the discrete 3D representations include one of the lane boundaries, lane lines, lane colors, and lane types having detection points that are sparse and coarse.

10. A non-transitory computer-readable medium comprising:

instructions that when executed by a processor cause the processor to:

generate a sequence of lateral slices for a road graph using discrete three-dimensional (3D) representations, and the sequence forms a road edge that is a road segment connected in the road graph with another road edge at a node and the road graph topologically describes a mapped area;

identify parameters by channelizing the sequence individually to estimate lane boundaries along the road edge;

encode features across the sequence by a transformer that correlates context and the parameters about the lateral slices, and the transformer is a network having a feed-forward architecture, and select by the transformer a cluster of the lateral slices from the sequence near a target slice having an information gap using the context and the context has visual lateral details about the road edge and the lane boundaries; and decode the features across the sequence using a learning model to compute a lane structure along the road graph.

11. The non-transitory computer-readable medium of claim 10 further including instructions to:

estimate by the transformer a lane characteristic to fill the information gap using a structural relationship about the road edge between the target slice and the cluster; and assemble a map by organizing the target slice within the lateral slices according to the context.

12. A method comprising:

generating a sequence of lateral slices for a road graph using discrete three-dimensional (3D) representations, and the sequence forms a road edge that is a road segment connected in the road graph with another road edge at a node and the road graph topologically describes a mapped area;

identifying parameters by channelizing the sequence individually for estimating lane boundaries along the road edge;

encoding features across the sequence by a transformer correlating context and the parameters about the lateral slices, and the transformer is a network having a feed-forward architecture, and selecting by the transformer a cluster of the lateral slices from the sequence near a target slice having an information gap using the context and the context has visual lateral details about the road edge and the lane boundaries; and decoding the features across the sequence using a learning model for computing a lane structure along the road graph.

13. The method of claim 12 further comprising:

estimating by the transformer a lane characteristic to fill the information gap using a structural relationship about the road edge between the target slice and the cluster; and assembling a map by organizing the target slice within the lateral slices according to the context.

14. The method of claim 13, wherein the information gap is a center line of the mapped area that is missing and the cluster includes the lateral slices having the center line.

15. The method of claim 12, wherein identifying the parameters further includes counting detection points in a bin for the lateral slices individually associated with the lane structure.

16. The method of claim 12, wherein decoding the features further includes:

outputting a characteristic that is one of a boundary shape, a boundary position, a line type, a line color, a speed limit, and a lane direction for the target slice from the sequence.

17. The method of claim 16 further comprising:

estimating a lane group by organizing the lateral slices according to the characteristic;

inferring missing data for the lane structure according to the lane group; and locating a start, a continuation, and an end segment of the lane group according to the missing data.

18. The method of claim 12, wherein the lane structure includes locations of the lane boundaries, center lines, and colors associated with the road edge.

19. The method of claim 12, wherein the lateral slices are subsections of the road edge having detection points from the discrete 3D representations that are sparse.

20. The method of claim 12, wherein the discrete 3D representations include one of the lane boundaries, lane lines, lane colors, and lane types having detection points that are sparse and coarse.

* * * * *